United States Patent
Pfersch

[15] 3,659,173
[45] Apr. 25, 1972

[54] AIRCRAFT CONTROL SYSTEM INCLUDING LIMITING MEANS

[72] Inventor: George H. Pfersch, Randolph Township, Morris County, N.J.

[73] Assignee: The Bendix Corporation

[22] Filed: June 19, 1970

[21] Appl. No.: 47,850

[52] U.S. Cl. ........................................................ 318/584
[51] Int. Cl. ............................... B64c 13/18, G05d 1/08
[58] Field of Search ........................ 318/584, 635, 561, 619

[56] References Cited

UNITED STATES PATENTS

| | | | |
|---|---|---|---|
| 3,241,027 | 3/1966 | Albright | 318/561 |
| 3,242,407 | 3/1966 | Hansen | 318/619 |
| 3,241,792 | 3/1966 | Hattendorf | 318/584 |
| 3,424,402 | 1/1969 | Bulloch et al. | 318/635 |

*Primary Examiner*—Harold Broome
*Attorney*—Anthony F. Cuoco and Plante, Hartz, Smith and Thompson

[57] ABSTRACT

A feedback system for controlling an aircraft as a function of a primary flight parameter and including limiting means whereby a secondary flight parameter becomes the controlling feedback parameter.

7 Claims, 1 Drawing Figure

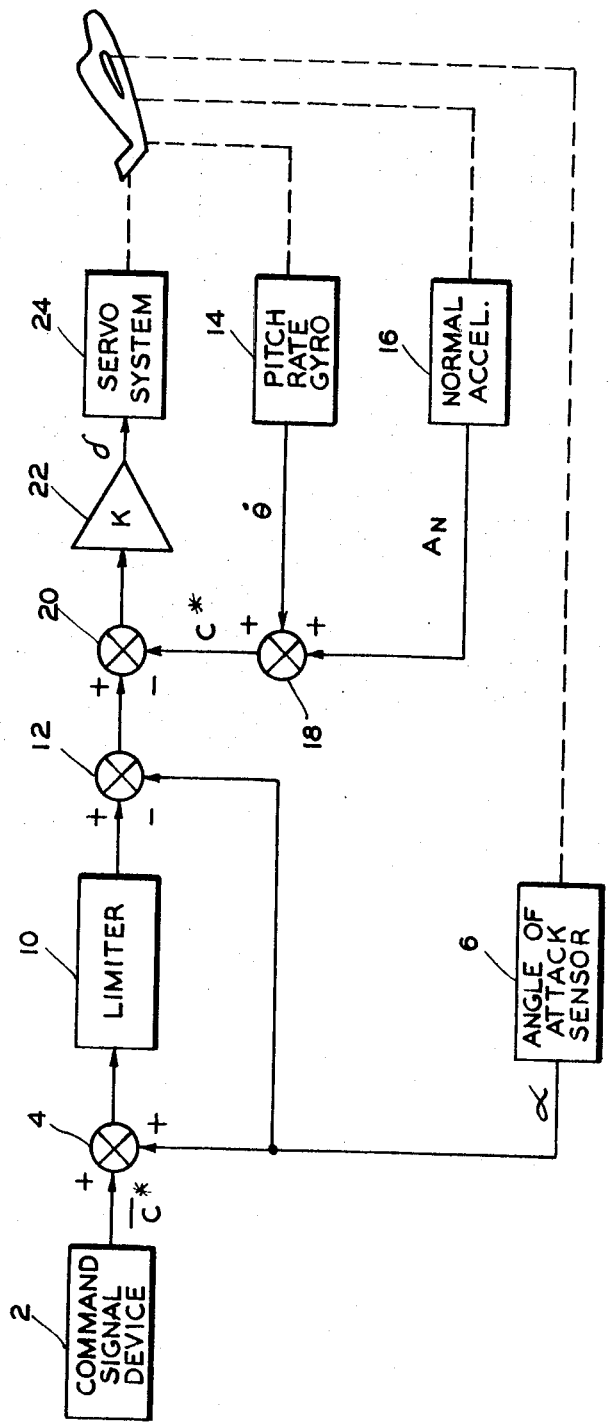

AIRCRAFT CONTROL SYSTEM INCLUDING LIMITING MEANS

BACKGROUND OF THE INVENTION

1. Field of the Invention

This invention relates to feedback control systems of the type for controlling aircraft and, more particularly, to limiting means for said systems.

2. Description of the Prior Art

Aircraft control systems include means for providing a signal corresponding to a commanded value of a flight parameter and sensing means mounted to the craft for providing a signal corresponding to the actual value of the parameter. The actual parameter signal is fed back and summed with the command signal for providing a control signal.

Often, especially when controlling modern high speed craft, the controlled parameter affects some secondary parameter and limiting is required to prevent the secondary parameter from reaching a critical value.

SUMMARY OF THE INVENTION

This invention contemplates an aircraft control system including sensors for providing signals corresponding to primary and secondary flight conditions and a signal source for providing a signal corresponding to a commanded value of the primary flight condition. The secondary flight condition signal and the command signal are combined and limited and the primary flight condition signal is combined in feedback relation with the limited signal to close a control loop for providing a control signal. The signal combinations are such that when the secondary flight condition signal is less than a predetermined limit it has no effect on the control loop and when the limit is equalled or exceeded the limited signal is a command for a new control loop with the secondary flight condition being the feedback function.

One object of this invention is to control an aircraft for a primary flight condition and to limit the control as a function of a secondary flight condition affected by the primary flight condition.

Another object of this invention is to limit the effect that variations in the primary flight condition have on the secondary flight condition.

Another object of this invention is to provide a control system which affects control as a function of a primary flight condition. A primary flight condition command signal is combined with a sensed secondary flight condition signal and the combined signal is applied to a limiter. When the combined signal is below the limit of the limiter the secondary condition signal has no effect on the control channel, but when the combined signal equals or exceeds the limit the combined signal is a command for a control loop with the secondary signal being the feedback parameter.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWINGS

The single FIGURE of the drawing is a block diagram of an aircraft control system according to the invention.

DESCRIPTION OF THE INVENTION

When controlling vertical flight of an aircraft critical parameters include pitch rate, normal acceleration and angle of attack. Pitch rate and normal acceleration are sensed and signals corresponding to the sensed parameters are added. The addition signal and a signal corresponding to a commanded value of pitch rate plus normal acceleration are compared and the craft is controlled by a servo system in response to the difference signal.

Angle of attack may be defined as the angle formed by the chord of the wing of the craft and the direction of the air through which the wing moves. For any wing section there is an angle of attack which creates a maximum lift (the upward force that opposes the pull of gravity on the craft). If this angle of attack is exceeded, the lift will decrease and the craft will stall.

In order to preclude the above-mentioned stalling it is necessary that the aircraft be flown at a pitch attitude that will maintain proper angle of attack. Therefore, when controlling the vertical flight of the craft in response to pitch rate and normal acceleration signals, for example, the control signal derived from said signals must be limited as a function of angle of attack.

In accordance with the above, an aircraft control system according to the invention and as shown in the drawing includes a signal source 2 for providing a signal $\overline{C}^*$ corresponding to commanded pitch rate plus normal acceleration of an aircraft 8. Signal $\overline{C}^*$ is applied to a summing means 4 and summed thereby with a signal $\alpha$ corresponding to angle of attack of aircraft 8 and provided by a sensor mounted to the aircraft. The signal from summing means 4 is applied to a limiter 10 which limits the signal as will be hereinafter described and the limited signal is applied to summing means 12 and summed thereby with angle of attack signal $\alpha$. Limiter 10 is a conventional type device and may be of the type described at pages 412–414, *Electronics for Scientists*, Malmstadt, et al., W.A. Benjamin, Inc., New York, 1963, and is connected to summing means 4 as will be understood by those skilled in the art.

A pitch rate gyro 14 mounted to aircraft 8 provides a pitch rate signal $\dot{\theta}$ and a normal accelerometer 16 mounted to the craft provides a normal acceleration signal $A_N$. Signals $\dot{\theta}$ and $A_N$ are added by a summing means 18 which provides a signal $C^*$ corresponding to actual pitch rate plus normal acceleration of aircraft 8.

The signal from summation means 12 and signal $C^*$ from summation means 18 are subtracted by a summation means 20 and the difference signal therefrom is applied to an amplifier 22 having a predetermined gain K for providing a control signal $\delta$. Control signal $\delta$ is applied to a servo system 24 which is coupled by suitable mechanical means as will be understood by those skilled in the art to a control surface (elevator) of aircraft 8 for operating the control surface.

Servo system 24 is a conventional device of the type including a servo amplifier, a servo motor for driving a rate generator and appropriate follow-up means such as described in U.S. Pat. No. 2,879,015 to Ardia and assigned to the Bendix Corporation, assignee of the present invention.

Summing means 4, 12, 18 and 20 may be conventional devices of the operational amplifier type such as described at page 354, *Electronics for Scientists*, supra, and likewise connected as will be understood by those skilled in the art.

OPERATION

In the context of the invention, pitch rate plus normal acceleration is a primary flight parameter and angle of attack is a secondary parameter for which limiting is required. Angle of attack signal $\alpha$ is applied to the control signal chain at summing means 4 where it is added to command signal $\overline{C}^*$. The signal from summing means 4 is limited by limiter 10 and the limited signal and angle of attack signal $\alpha$ are subtracted by summing means 12.

When angle of attack signal $\alpha$ is less than a predetermined limit established by limiter 10, its contribution to the control signal chain is zero because of the unity addition and subtraction of the signal before and after limiting, respectively. However, when the sum of command signal $\overline{C}^*$ and angle of attack signal $\alpha$ equals or exceeds the predetermined limit, the output of limiter 10 is in effect a command signal for a new control loop with angle of attack being the feedback parameter. Since the command to this loop is constant, the feedback parameter attempts to remain constant within its loop response capabilities. Thus, the secondary parameter, angle of attack, is limited as long as the input signal to the limiter remains at or above the predetermined limit.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A control system comprising:

first sensing means for providing a signal corresponding to a primary condition;

a signal source for providing a primary condition command signal;

second sensing means for providing a signal corresponding to a secondary condition;

means connected to the signal source and to the second sensing means for combining the command signal and the secondary condition signal;

means connected to the combining means for limiting the combined signal;

means connected to the limiter and to the second sensing means for combining the limited signal and the secondary condition signal;

means connected to the last mentioned combining means and to the first mentioned sensing means for combining the signals therefrom and for providing a control signal; and means responsive to the control signal for affecting control.

2. An aircraft control system comprising:

means for providing a pitch rate signal;

means for providing a normal acceleration signal;

means for providing an angle of attack signal;

means for providing a signal corresponding to a commanded sum of pitch rate and normal acceleration;

means for adding the angle of attack signal and the command signal;

a limiter connected to the adding means for limiting the signal therefrom;

means connected to the angle of attack signal means and to the limiter for subtracting the signals therefrom;

means connected to the pitch rate signal means and to the normal acceleration signal means for adding the signals therefrom;

means connected to the subtracting means and to the last mentioned adding means for subtracting the signals therefrom and for providing a control signal; and means connected to the control signal means and to the aircraft for controlling the craft in response to the control signal.

3. A control system as described by claim 1 wherein the system controls an aircraft and the means for providing a signal corresponding to a primary condition includes:

means for providing a signal corresponding to the pitch rate of the craft;

means for providing a signal corresponding to the normal acceleration of the craft; and means connected to the pitch rate signal means and to the normal acceleration signal means for adding the signals therefrom.

4. A control system as described by claim 3, wherein:

the means for providing a signal corresponding to a secondary condition includes means for providing an angle of attack signal.

5. A system as described by claim 4 wherein the means connected to the primary condition command signal means and the secondary condition signal means for combining the signals therefrom includes:

means connected to the command signal means and means connected to the angle of attack signal means for adding the signals therefrom.

6. A control system as described by claim 5 wherein the means connected to the limiter and to the secondary condition signal means for combining the signals therefrom includes:

means connected to the limiter and to the angle of attack signal means for subtracting the signals therefrom.

7. A control system as described by claim 6 wherein the means connected to the last mentioned means and to the primary condition signal means for combining the signals therefrom and for providing a control signal includes:

means connected to the means for subtracting the limited signal and the angle of attack signal and connected to the means for adding the pitch rate signal and the normal acceleration signal for subtracting the signals from said subtracting and adding means.

* * * * *